US007920158B1

(12) United States Patent
Beck et al.

(10) Patent No.: US 7,920,158 B1
(45) Date of Patent: Apr. 5, 2011

(54) INDIVIDUAL PARTICIPANT IDENTIFICATION IN SHARED VIDEO RESOURCES

(75) Inventors: Alexander J. G. Beck, Frenchs Forest (AU); Andrew W. Lang, Epping (AU); Paul Thomas McNamara, Killarney Heights (AU); David Preshan Thambiratnam, Ashfield (AU); James K. Wan, Carlingford (AU)

(73) Assignee: Avaya Inc., Basking Ridge, NJ (US)

( * ) Notice: Subject to any disclaimer, the term of this patent is extended or adjusted under 35 U.S.C. 154(b) by 974 days.

(21) Appl. No.: 11/490,906

(22) Filed: Jul. 21, 2006

(51) Int. Cl.
*H04N 7/14* (2006.01)
*H04N 7/00* (2006.01)
*H04N 5/225* (2006.01)
*H04N 7/18* (2006.01)
*G06F 15/16* (2006.01)

(52) U.S. Cl. ........ 348/14.08; 348/36; 348/169; 348/143; 709/204

(58) Field of Classification Search .............. 709/204; 705/14; 707/104.1; 455/456.2; 348/36, 348/143, 169, 14.08
See application file for complete search history.

(56) References Cited

U.S. PATENT DOCUMENTS

| | | | |
|---|---|---|---|
| 5,675,376 A | 10/1997 | Andersson et al. | |
| 6,404,900 B1 | 6/2002 | Qian et al. | |
| 6,507,356 B1 | 1/2003 | Jackel et al. | |
| 6,812,956 B2 * | 11/2004 | Ferren et al. | 348/14.08 |
| 6,963,352 B2 | 11/2005 | Whynot et al. | |
| 2005/0062844 A1 * | 3/2005 | Ferren et al. | 348/14.08 |
| 2006/0256983 A1 * | 11/2006 | Kenoyer et al. | 381/122 |

FOREIGN PATENT DOCUMENTS

| | | |
|---|---|---|
| WO | WO 2004/029885 | 4/2004 |
| WO | WO 2005/018190 | 2/2005 |

OTHER PUBLICATIONS

Article Entitled "Automatic Detection of Human Faces In Images", by Peter Peer and Franc Solina for Computer Vision Laboratory, Supported by the Ministry of Science and Technology of Republic of Slovenia (Project J2-8829), 4 pages.
USPTO Database Search Results, Search Criteria "TTL/'human face' and Detection in US Patent Collection", 1 page.
CiteSeer May 5, 2006 Search Results @ http://citeseer.ist.psu.edu/635396.html, 2 pages with Article Entitled Detection of Human Faces in Compressed Domain for Video Stratification (2002) by Tat-Seng Chua, Yunlong Zhao, Mohan S. Kankanhalli, 18 pages.
CiteSeer May 5, 2006 Search Results @ http://citeseer.ist.psu.edu/669775.html 1 page with Article Entitled "Human Faces Detection and Tracking in Video Sequence" by Sequence Renaud Seguier, Annick Le Glaunec, Bernard Loriferne, 8 pages.

* cited by examiner

*Primary Examiner* — Nathan Flynn
*Assistant Examiner* — Stephanie Chang
(74) *Attorney, Agent, or Firm* — Sheridan Ross P.C.

(57) ABSTRACT

An integrated communications system is provided wherein video conferencing is conducted and participants sharing a video resource may be identified. Application of the present invention is particularly suited for videoconferencing when there are a plurality of communication endpoints, and at least one of the communication endpoints includes multiple participants at the shared video resource. A video or audio processing technique takes place to identify locations of conference participants at the communication endpoints. Each participant has an assigned RFID identifier during the conference. The RFID identifiers are interrogated by an RFID reader that downloads data from the identifiers to the system. The gathered RFID data is then matched with the processed video or audio data in order to identify each of the conference participants. A user interface is provided to allow the participants to view the other remote participants along with the identifying data of the remote participants. The data may include, for example, each remote participant's name displayed directly below the video image of that remote participant. As time progresses during the conference, participant identity is tracked and updated by repeating the video/audio processing technique and repeating the interrogation of the RFID identifiers.

36 Claims, 3 Drawing Sheets

INDIVIDUAL PARTICIPANT IDENTIFICATION IN SHARED VIDEO RESOURCES

FIELD OF THE INVENTION

The present invention relates to video conferencing, and more particularly, to a method and system for identifying participants using a shared video resource during the videoconference. The identification is achieved by a combination of video or audio processing techniques in conjunction with an RFID application wherein personal data may be associated with each participant and displayed on a user interface used during the conference.

BACKGROUND OF THE INVENTION

Telephony systems allowing voice communications between remote communicants have been available for many years. Communication systems that provide video capabilities to the communicants have also been developed. For example, there are a number of known systems that allow voice and video data to be transmitted using conventional telephone communication systems. With the development of high-speed Internet connections, video communication systems using Internet protocol (IP) communication channels have also been developed.

Systems allowing video and audio data to be transmitted across conventional telephone lines require that the communication end points each have compatible video and telephone devices. In addition, the Private Branch Exchange (PBX) or Public Switched Telephone Network (PSTN) and office switches used for such communications must be upgraded, as compared to conventional audio only switches, in order to handle the combined video and audio data streams.

For video telephones that make use of the internet as the communication network rather than the public switched telephone network, these video telephones also require the end points to have compatible equipment. Typically, video communications using the Internet make use of a personal computer as the device with the requisite microprocessor capability to handle the video stream. Callers in this type of system require the Internet address or IP address of the endpoint(s) being contacted.

More recently, the most popular systems for video conferencing utilize an IP type connection for transmitting integrated audio and video, but allow such connections to be established using a telephone number. According to such systems, a user can initiate audio-video communications by dialing the telephone number associated with an endpoint having integrated video telephony capabilities. However, these communications also require especially equipped communication servers to handle the combined audio and video communications. Video conferencing techniques have advanced to a point where video conferencing today is a very common way to provide communications between remote parties.

For those video conferencing communications that take place between only two parties, there is rarely a concern or question regarding which person is speaking at that moment, since there are only two parties to the conversation. However, with respect to a shared video resource where there are a number of participants present at a particular location, it becomes very difficult to distinguish as to the identity of the party speaking at a particular time, and to directly associate a video image to the person who is speaking. The video that is generated at a shared video resource may only provide a single view of the room in which the participants are located, and such a view therefore does not allow for any type of video emphasis for any of the participants. Particularly with respect to formal communications that may take place between two organizations where there are a number of participants located at the video resource of each communication end point, video conferencing can sometimes present confusion since multiple remote parties speaking at or near the same times makes it difficult to closely follow the course of the conversation.

Some efforts have been made to identify a conference participant, especially in cases where not all of the conference participants are known to each other, or in cases where it may be difficult to understand what a participant is saying. One example of a prior art reference that discloses a system and method for indicating the identity of a speaker during a conference includes the International Publication No. WO2005/018,190. The invention disclosed in this reference utilizes speech recognition, speech to text, and text to speech applications for distinguishing between participants of the conference. However, one disadvantage of using speech recognition is that data samples of each of the conference participants must be taken prior to the conference in order to match each participant's voice with the stored data sample. Thus, for personnel who attend conferences such as guests or other unexpected parties, there is no way to identify those individuals since no prior voice sample is available.

Another reference that discloses a system that can be used to distinguish participants in a videoconference includes the International Publication No. WO2004/029,885. This system uses video image recognition for obtaining personal information related to a target person. An image acquisition device is used for capturing a video image of the target person. A database is created of stored image data items each relating to one of a plurality of candidate persons. Each image data item is associated with stored personal data relating to respective candidate persons. A search engine is used to then match the captured image of the target person to candidate person image data, and the personal data relating thereto is retrieved. A display device such as a video monitor displays the personal data matching the target person. Each candidate person has the ability to control third party access to the stored personal data relating to the candidate person. As with the speech recognition discussed above, the image acquisition device of this invention requires that certain data be stored about a conference participant prior to the conference, and in the event that a guest is present at a conference, it is extremely unlikely that any data will be available about the guest; therefore, no identification can be made of the identity of the guest.

Therefore, there is a need to provide a system and method for identifying conference participants wherein identification can be achieved at a minimum cost and without substantially adding to system software and hardware requirements.

Additionally, there is a need to provide such identification capability with respect to all conference participants whether the participants are planned attendees or whether the conference participants are unscheduled, and have done nothing more than perhaps sign in at the location where the conference is to be conducted.

Furthermore, there is a need to provide an acceptable level of personal privacy for conference participants wherein only authorized information is released regarding any conference participant.

SUMMARY OF THE INVENTION

The present invention is directed to solving these and other problems and disadvantages of the prior art. According to embodiments of the present invention, a video conferencing system and method are provided wherein individual participants can be identified when the participants are using the same video resource at the communication endpoint. The system and method of the present invention can be incorporated into traditional telephone networks, as well as IP networks, and various hybrid systems including elements of both a traditional telephony network and an IP network.

In accordance with embodiments of the present invention, endpoints to a video telephony conference communication session each include an audio transceiver such as a telephone, a video camera, a video display, and various software applications running on a platform that is integrated with or interconnected to the telephone, video camera, and video display. Additionally, each of the endpoints includes an identification component. In one preferred embodiment, the identification component comprises an RFID identification comprising a movable directional RFID reader and one or more RFID identifiers that correspond to each of the participants in the conference. In other preferred embodiments, the identification components may comprise printed nametags, barcode tags, or other visual tags that are carried or worn by the participants. The telephone may comprise a stand-alone telephone providing a Computer Telephony Integration (CTI) interface, a stand-alone IP soft phone, or an IP soft phone implemented through or in connection with a computer platform. The video camera may be provided as a peripheral to a computing platform. Similarly the video display may be provided as a peripheral to a computing platform. In a typical implementation, the various software implementations are provided on a computing platform such as the same platform as the video camera and video display are connected. Additionally, the RFID components are also interconnected to the computing platform.

A system in accordance with the embodiments of the present invention makes use of one or more communications networks. In particular, the audio portions of a communication session may be carried by a communication channel established across a communications network between audio gateways or switches local to the communication endpoints. Similarly, video communications may be carried over a video channel established across a communications network between network browsers and/or switches local to each of the video enabled communication endpoints. The separate audio and video communication channels may be established over the same communication network or over different communication networks.

In accordance with the method of the present invention, each video conferencing participant located at each remote location is provided an identifier, such as an RFID transponder. Each transponder uniquely identifies each conference participant, and some data is stored in the system prior to the conference that matches the code or data for each participant having a transponder. Alternatively, the identifiers can simply be nametags that uniquely identify each participant. One option is to provide printed nametags with the participants' names. Another option is to provide a barcode tag that uniquely identifies each participant. When video communications are established between communication endpoints, for participants sharing a video resource, a video processing technique takes place through the respective computing devices/processors found at those communication endpoints. The video processing results in the production of data that determines the locations of participants at those communication endpoints. The video processing technique does not actually identify the conference participants, but only provides an indication as to the locations of the participants within the field of view of the video camera located at the endpoint. Simultaneous with the video processing or at some other designated time, the identifiers worn or carried by the participants are identified by the system and then matched to generate an output that provides identification of the participants. In the case of RFID transponders carried by each of the participants, the transponders are interrogated by respective RFID readers found at the endpoints. Preferably, the RFID readers are movable directional RFID readers wherein the readers can move their respective interrogation fields to interrogate each participant. Alternatively, if the RFID readers are not movable, multiple RFID readers can be integrated at each communication endpoint to ensure the interrogation fields effectively cover the areas in which the participants are located during the conference. The RFID data is gathered and correlated or matched to the video processing data in order to generate an output that provides identification of conference participants. In the case of printed nametags worn by participants, the video camera located at the endpoint must have the capability to view the nametag in enough detail to identify the same. Accordingly, it may be necessary for the video camera to initially zoom in on the printed nametags in order to view the tags. In the case of barcode tags carried by participants, a bar code reader can be incorporated in the system to match the bar code information to the video processing data.

The linking of the identification data provided by the identification components to the video processing data can result in an output such as a user interface in the form of a screen display having various visual indicators denoting the conference participants and the associated data that has been previously stored about each participant. In lieu of or to supplement the video processing technique to determine locations of participants, it is also contemplated that the locations of each of the participants may be determined by an audio triangulation and discrimination technique. According to this audio technique, multiple microphones may be provided at a selected communication endpoint, and the signals from the multiple microphones can be processed to provide location data as to participants that speak during the conference. This location data then is also correlated to the identification component data in order to establish the user interface that identifies the conference participants.

The video and audio presentation of participants at one communication endpoint to another endpoint can occur either when those participants have been identified, or at any time prior to identification. If presentation is selected prior to identification, then the conference could be conducted, but not with the benefit of the user interface providing participant identification. If presentation were selected only after identification, then there would be some minimal delay in transmission of the presentation until the identification process was completed. In the event identification of some of the participants was not possible at the time (e.g., a malfunctioning RFID transponder was being used or the field of view of the video camera could not capture all participants), the system and method of the present invention contemplates the ability for a user to select options as to when the presentation should begin despite potential failures in identification.

As the conference takes place, continued or cyclical video/audio processing and identification component viewing/processing takes place in order to confirm and update the conference participants. If a participant leaves the conference, then the visual indication of that participant can be deleted from the user interface visual display. Similarly if a new participant arrived to the conference, the visual display would be updated to show the presence of the new participant, to include any identification data that was obtained prior to the conference.

It is also contemplated that participants leaving the field of view of the video camera yet still attending the conference can continue to be identified. For example, one or more additional cameras could be used to track locations of participants who are not in the field of view of the main video camera and are considered "off-camera", but are still participating in the conference and may be speaking. In this case, the user interface visual display could be updated show that the participant was still present but off-camera. Additionally, if voice recognition data was available for participants, the voice recognition data could be linked to the off-camera participant in order to allow the system to continue to track the participant during the conference.

Additional aspects of the embodiments of the present invention become more readily apparent from the foregoing description, particularly when taken together with the accompanying drawings.

DETAILED DESCRIPTION

Figure 1:
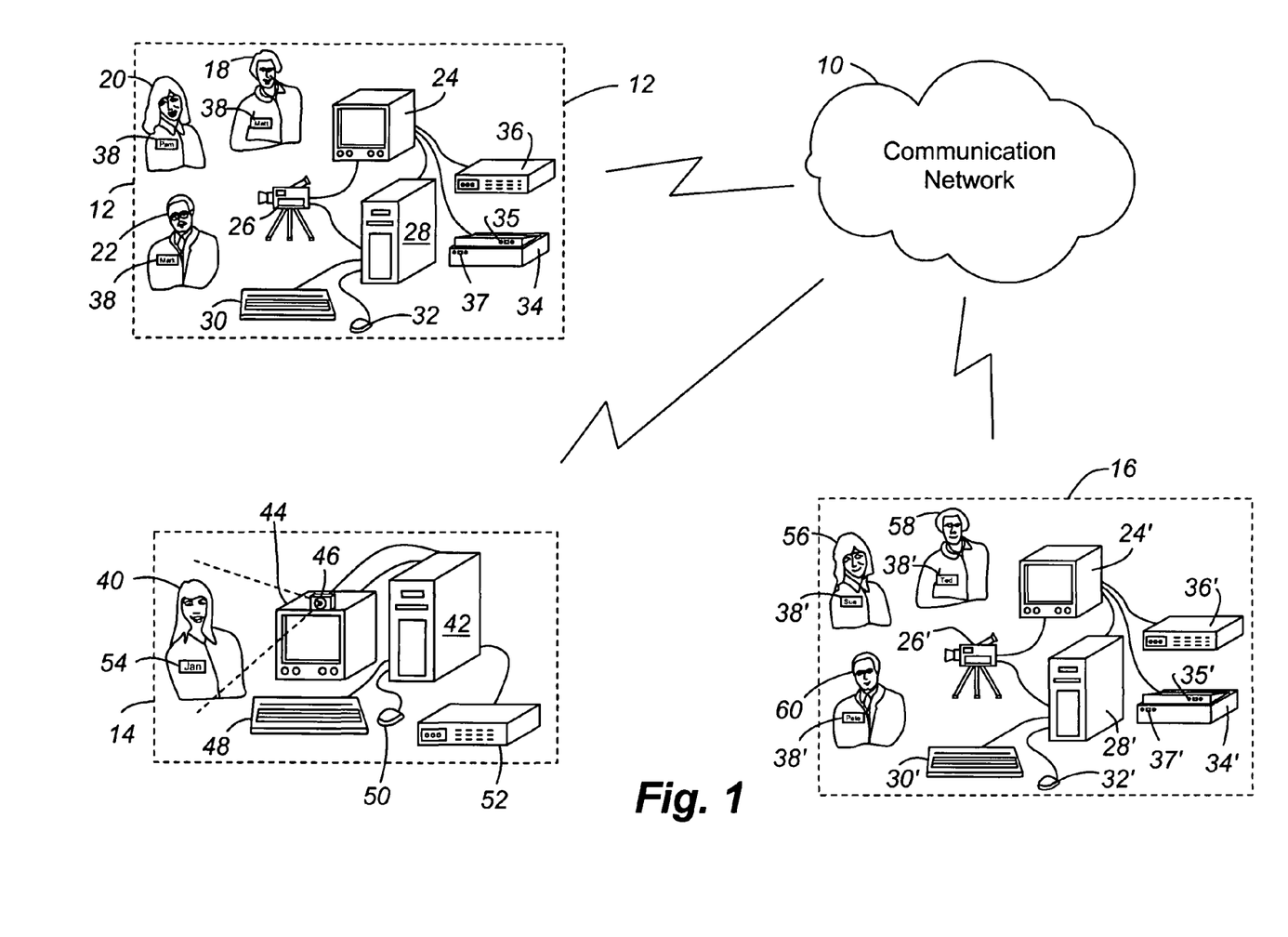
FIG. 1 is a schematic diagram illustrating a communication network and a plurality of communication endpoints participating in a video telephone conference, two of the communication endpoints having multiple participants using a shared video resource.

With reference now to FIG. 1, an example communication system in accordance with the present invention is depicted. The communication system includes a number of communication endpoints, shown as endpoints 12, 14 and 16. Each of the communication endpoints includes the necessary communication equipment to enable communication across the communication network 10. The communication network 10 may be a single communication network, or may comprise a plurality of communication networks.

Communication endpoints 12 and 16 each include a plurality of videoconference participants sharing the same video resource in the form of a single video camera that takes images of the participants during a conference. Specifically, communication endpoint 12 includes participants 18, 20 and 22, and a single video camera 26. Similarly, communication endpoint 16 includes participants 56, 58 and 60, along with a single video camera 26'. The end points 12 and 16 each further include respective video monitors 24/24' to view video images of the remote participants of the videoconference. The endpoints also include respective audio transceivers/telephones 24/24' for transmitting and receiving audio data, the transceivers each shown as including a speaker 35/35' and a microphone 37/37'. Endpoints 12 and 16 are also shown as including respective computing devices 28/28' used to run various software applications, and to provide other functions as discussed further below. The computing devices may each have conventional input devices such as keyboards 30/30' and mice 32/32'. The communication endpoints 12 and 16 each further include respective RFID readers 36/36' along with a plurality of identifiers 38/38' such as RFID transponders. The transponders are assigned to the designated participants of the conference at each communication endpoint. In lieu of RFID identifiers, identifiers 38/38' may represent printed tags with the names of the participants, color coded tags uniquely identifying the participants, barcode tags, or any other visual means carried or worn by the participants that uniquely identifies the participants. In the Figure, names appear on the identifiers for ease of distinguishing the example participants. In the event that tags other than RFID identifiers are used, it would of course be unnecessary to have RFID readers at the communication endpoints.

Communication endpoint 14 is also shown, this endpoint being shown as having a single conference participant 40. This communication endpoint may also be equipped in a similar manner as the other endpoints. Thus, endpoint 14 includes a computing device 42, video monitor 44, camera 46, input devices 48 (a keyboard) and 50 (a mouse), an identifier 54, and an RFID reader 52 if RFID transponders are used. In the communication endpoint 14, in lieu of a separate audio transceiver/telephone, the computing device 42 incorporates soft IP telephone functionality.

Each of the communication endpoints 12, 14, and 16 may include a number of separate contact points for interconnecting the endpoints through the network 10 and/or for use with different types of communication channels. For example, the communication endpoints may each include their own designated audio contact point, data contact point, and video contact point. In general, the communication endpoints may have different routers and/or switches necessary to support communications or the exchange of data by devices or applications associated with each of the endpoints. Accordingly, where an audio transceiver/telephone associated with a particular communication endpoint is part of a Private Branch Exchange (PBX), an audio contact point comprising a private branch exchange server may be provided. As a further example, where an audio transceiver/telephone comprises a conventional switch to a circuit switched telephone, the audio contact point may comprise a telephone company and office switch. As yet another example, the audio contact point may comprise a gateway between a local area network to which an associated audio transceiver/telephone is interconnected and the communication network comprises a wide area network, such as the Internet. For the communication endpoint 14, the audio transceiver is incorporated in the computing platform 42 as a soft IP phone, and this type of audio transceiver would be connected to the Internet via an IP network router. Similarly, the video contact point that is local to the respective video devices 26/26' and 46 may be determined by the type of network over which video communications or data is transmitted. An example of video contact point may also comprise an IP network router. As can be appreciated by those skilled in the art from the description provided herein, the functions of the individual contact points described herein can be combined in one or more shared devices.

The communication network 10 may comprise one or more networks of one or more types. For example, the communication network 10 may comprise a packet data network, or a combination of packet data and switched circuit networks. As a further example, the communication network 10 may comprise the Internet, an intranet, or a combination of one or more of the intranets and the Internet. Furthermore, a number of communication and data channels may be established across the communication network. In particular, separate audio and video communication channels may be established across the network.

The computing devices or platforms 28,28', and 42 may include any general-purpose programmable processor or controller for executing application programming. Alternatively, the processors may comprise specially configured Application Specific Integrated Circuits (ASIC). The processors generally function to run programming code implementing various other functions performed by the communication endpoints, including telephony, video communications, video telephony integration applications, and RFID applications, as further described herein.

Figure 2:
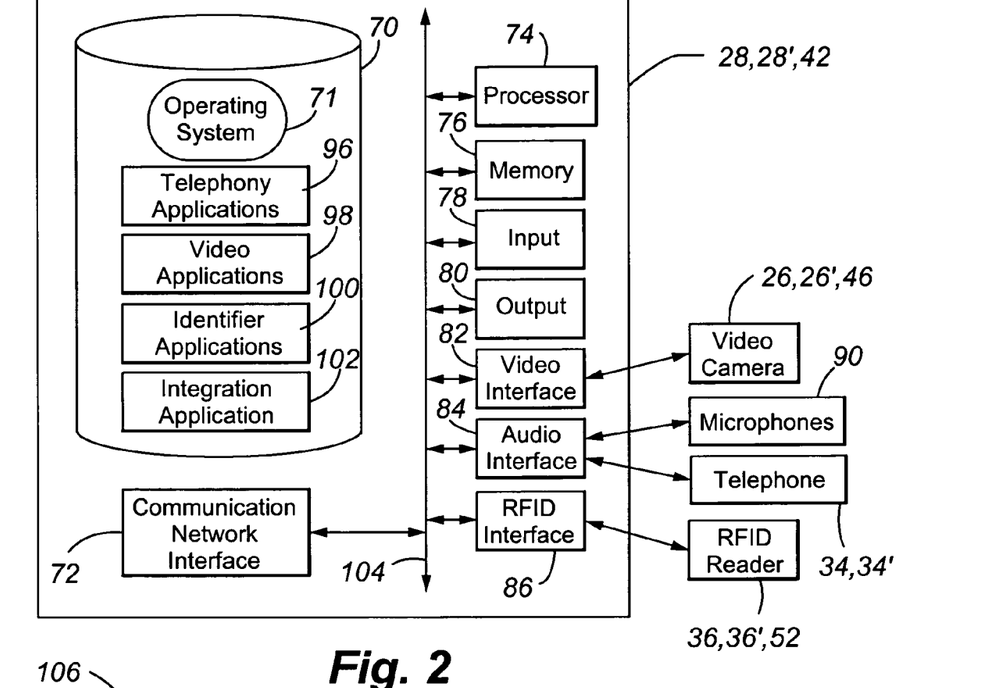
FIG. 2 is an example of a user interface display, namely, a screen shot that can be provided on a visual display for identifying conference participants at each communication endpoint.

As further depicted in FIG. 2, the computing devices 28/28'/42 are each further described with respect to their basic elements and functionality associated with the elements. As shown, each computing device may include a memory 76 for use in connection with the execution of programming by a processor 74, and for the temporary or long-term storage of data or program instructions. The memory 76 may comprise solid-state memory, such as DRAM and SDRAM. Where the processor 74 comprises a controller, the memory 76 may be integral to the processor 74. In addition, the computing devices may include various input devices. For example, the input devices may include the respective keyboards and mice. The computing devices may also include data storage 70 for storage of application programming and data. For example, operating system software 71 may be stored in the data storage 70, as well as a telephony application 96, the telephony application 96 operating providing various voice telephony functions. For example, the telephony application may comprise an IP softphone implemented in connection with hardware provided by the communication device. As another example, the telephony application may comprise an application for monitoring the operating status of telephones 34/34' connected with the computing device and for obtaining information from the telephones. A video application 98 that is separate from the telephony application can also be stored in the data storage 70. In accordance with the present invention, the video application 98 operates in connection with video cameras 26/26'/46, and the video displays provided by the communication devices in order to send and receive video communications, as well as to achieve the necessary video processing to identify participant locations in accordance with a selected video processing technique or protocol. The data storage 70 may also store identifier applications 100. For example, one application may include an RFID application that provides an interface for the download and storage of data from RFID transponders as interrogated by the RFID readers, as well as a local database to store RFID information entered at the respective communication endpoints. Further for example, an identifier application 100 may include a bar code application that provides an interface for the download and storage of data from bar code tags utilized by the participants. Furthermore, an integration application 102 may be stored in the data storage 70. The integration application 102 can generally function to monitor the operation of the video and identifier application so that communications can be provided once the processed video data and the identifier data is matched for identification of conference participants. The integration application 102 may further provide various options when different identifier and video components are found across different communication endpoints in the network, the integration application placing received video and identifier data in standard formats so that conference participants may communicate with one another under a common communication protocol. As can be appreciated by those skilled in the art, the data storage 70 may comprise a magnetic storage device, solid-state storage device, an optical storage device, logic circuit, or any combinations of such devices. It should further be appreciated that the programs and data that may be maintained in the data storage 70 can comprise software, firmware, or hardware logic, depending on the particular implementation of the data storage.

The computing devices may further include a communication network interface 72 through which an interconnection between the computing device and one or more communication networks may be established, for example, via a network contact point. Accordingly, the communication network interface 72 may be of a type required by an interconnecting contact point or by the communication network itself. Other interfaces may be provided for interconnecting the computing devices to the various peripheral devices. For example, a video interface 82 may be provided for interconnecting the computing device to the video cameras. As can be appreciated by one of skill in the art, a video interface may comprise a standard interface, such as a Universal Serial Bus (USB) interface or an IEEE 1394 interface. An audio interface 84 may also be provided for interconnecting the computing devices to the telephones/transceivers 34/34', for example, if the telephones 34/34' are full featured, conventional telephones, the audio interface may comprise a Computer Telephony Integration interface (CTI). As a further example, where telephony functionality is implemented as part of the soft telephone features provided by the computing device 42, the audio interface 84 may comprise a sound card for sending and receiving analog audio data to a speaker connected to the computing device, and from a microphone connected to the computing device. As yet another example, the audio interface may comprise a standardized interface, such as the USB or IEEE 1394 interface. The computing devices may each further include an RFID interface 86 that allows data from the RFID readers to be processed and coupled with the processed video images in order to identify conference participants. In the event bar code tags or other visual tags were used, additional interfaces could be provided to allow the identifier data to be processed and coupled with the processed video images in order to identify the participants. An internal bus 104 is generally provided to permit the exchange of instructions and data between the various components of the computing devices.

With respect to the particular manner in which video data is processed to locate conference participants, there are a number of contemplated methods by which this could take place in the present invention. One example of a method suitable for use in the present invention includes the method disclosed in the U.S. Pat. No. 6,404,900 entitled "Method for Robust Human Face Tracking in Presence of Multiple Persons", this reference being incorporated by reference herein in its entirety. In this reference, a single video frame is selected from a color video sequence. The selected frame is used then as a current input image. The current input image is filtered to form a filtered image. The locations and sizes of faces are estimated based on a projection histogram of the filtered image. Face motion is then estimated in the filtered image. The location and size of the tracked faces are then provided as a processed video output within the filtered image. Another method of providing video data processed to locate conference participants includes the method described in the article entitled "Automatic Detection of Human Faces in Images", by Peter Peer and Franc Solina, Computer Vision Laboratory, Faculty of Computer and Information Science, University of Ljubljana, Ljubljana, Slovenia, this reference also being incorporated by reference herein in its entirety. According to the method disclosed in this reference, a video image is analyzed for detection of eyes of the participants. Then based on geometric face characteristics, eye pairs are joined to a candidate, and the chosen candidate is then confirmed by analyzing color or complexion characteristics of the candidate. A face detection algorithm is applied to detect the presence of eyes in the video image as well as to define the geometric face characteristics of participants. The result of the method is the determination of the locations of human faces in the video image. In the present invention, by only gathering video data regarding the location of participants, it is unnecessary to provide multiple cameras at communication endpoints, and a single shared video camera resource can be used to obtain the necessary video data for multiple participants at the endpoint. Tracking of each individual participant can be achieved so long as the participant remains within the field of view of the single video camera.

In addition to or in lieu of using a video processing technique to obtain location data for conference participants, it is also contemplated that an audio processing technique could be used. One implementation of an audio method makes use of multiple microphones positioned around the participants at a communication endpoint. Audio signals generated by the participants as they speak can be processed to formulate position data corresponding to the locations of the participants at the location. This position data can then be correlated or matched to the identity data provided by the RFID transponders. Known audio triangulation techniques combined with auditory discrimination techniques can be used to formulate the position data for each speaker of the conference. Of course, one disadvantage of only using an audio processing technique is that participants who do not speak during the conference would not be identified.

In the event that RFID technology is used with the present invention, the RFID identifiers/transponders transmit radio frequency signals when placed in the read or interrogation zones of the readers or interrogators 36/36'/52. The readers pick up the signals from each of the transponders and decode the unique data stored in the transponders that identifies each transponder. As understood by those skilled in the art, RFID transponders contain a silicon memory chip that stores data about the item/person that carries the tag. This RFID data is then matched with the data records stored in the respective computing devices or a central server servicing each of the communication endpoints. The RFID readers are preferably directionally oriented so that the RFID readers can discriminate between different transponders located within a very small space. For example, in the case of a videoconference where there are a number of participants at a particular communication endpoint, the participants may be closely seated to one another and therefore, the RFID reader preferably has some directional capability in order to individually interrogate each of the transponders located within the interrogation field. One example of a directionally oriented RFID reader that is acceptable for use in the present invention is a dual directional RFID reader such as the types sold by Symbol Technologies Inc. (Dual Directional Panel Antenna Arrays) of Holtsville, N.Y. For these directional RFID readers, it is contemplated that each reader can be mounted on a motor assembly which rotates the RFID reader to sweep the necessary angle to effective interrogate the participants at the location. Alternatively, multiple directionally oriented RFID readers can be used to provide effective coverage of the area in which the participants are located during the conference.

In order to actually identify a participant, it is necessary to associate the identifier data with the video images or audio data processed. In short, the identifier data must be associated with a video or audio sample to allow identification and tracking of participants through some type of calibration or pre-identification protocol. For example, if there are two participants in the field of view of the camera, and a single RFID reader is used, the RFID reader will indicate at communication endpoint 12 that Pam is located left of Matt. Assuming the RFID reader is directly adjacent the camera, then those two participants have been identified. However, for a mobile RFID reader and/or if there are multiple RFID readers to be used at a communication endpoint, it is necessary to generate a signature of the room layout so that when the RFID reader(s) generate data regarding a scanned tag, the corresponding video/audio data can be matched to identify the participants. In this regard, by having the participants individually walk around the room at the location where the conference is to take place prior to conducting the conference, the system can record the correlation between the RFID data and the video/audio data. For example, assume that an RFID reader is set up on the opposite side of the room than the camera. In this instance, the RFID reader would indicate that Pam is far left but the image taken by the camera would indicate Pam is far right. This far left/far right relationship would be recorded by the system and when Pam then moves to her position during the conference, the system would correctly report her position.

Another way in which to achieve the association of the video image or audio data to the identifier data is to have each identifier pre-positioned at a known position or station in the field of view of the video camera. Thus when the video processing takes place to locate the presence of a participant, if a participant is located at a particular designated position, then the identifier data generated at that location results in matching the processed video to the person who has been assigned the particular identifier.

Yet another way in which identifier data can be associated to the video images of the participants would be to provide a unique visual identifier for pre-positioned participant stations. For example, a blinking light or an infrared emitter could visually identify an RFID station. The visual image of the participant at that station would then be linked to the RFID data assigned to that participant.

With use of identifier components such as visual tags or RFID components in the present invention, a very convenient means is provided for entering data about conference participants. For conference participants that are known well prior to the date of the conference, such information regarding the identities of the participants is presumably stored in organizational personnel files of the participants. With respect to guests that may be attending the conference and which may be considered as third parties to any of the organizations that are hosting the conference, basic information about those guest participants may be easily entered in the respective organization computer networks. For example, when a guest arrives at an organization, the guest is typically required to sign in at the receptionist's area, and provide basic information as to their name, organization, and purpose of the visit. As these guests sign in at the various organizations, this data can then be directly added to the database storing information on the conference participants. In the example, the receptionist's workstation presumably includes a personal computer linked to the organization's computer network. The receptionist would give the guest a tag, such as a bar code tag or an RFID transponder, and then would enter data in the workstation computer matching the transponder to the guest's personal information provided. Thereafter the tag can then uniquely identify the guest. For transponders, they can be worn as tags, or otherwise carried by the guest in a manner allowing it to be interrogated by an RFID reader during the conference.

In terms of personal privacy, use of the identifier components is preferable since prior to the scheduled conference, the manner in which data is obtained from guests as well as the type of data gathered is non-intrusive. For guests, the only information obtained is information that the guest is willing to provide. Other forms of data and methods of obtaining the data are inherently more intrusive and personal, such as obtaining pre-recorded voice recordings as required in voice recognition systems, or obtaining facial scans as required in various image acquisition systems.

Figure 3:
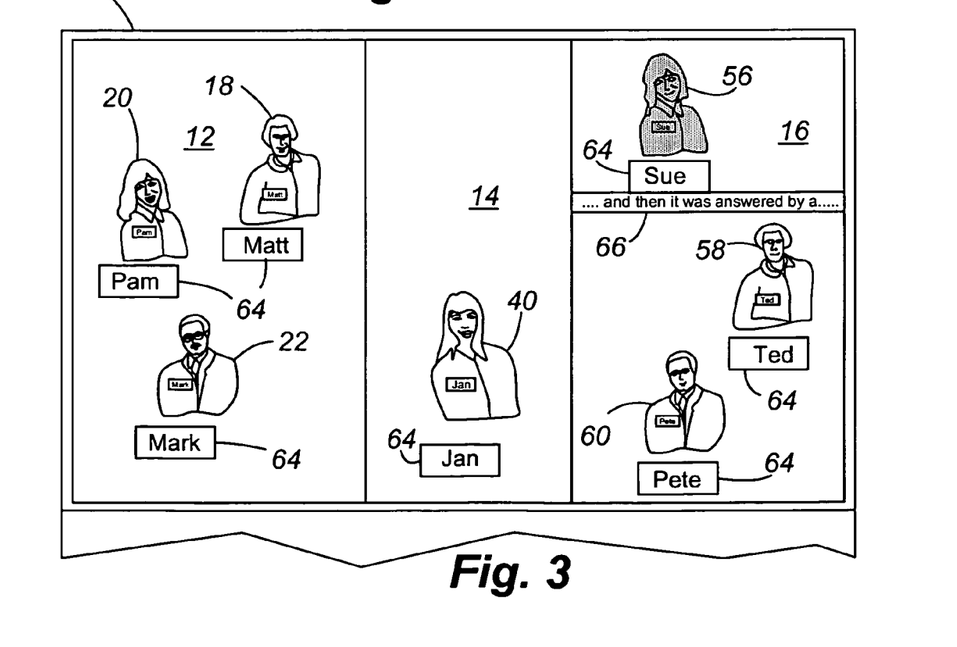
FIG. 3 is a schematic diagram further depicting the components found at the communication endpoints in accordance with embodiments of the present invention.

With reference now to FIG. 3, an example user interface 106 is provided. When the video/audio processing has resulted in separating and designating locations of participants using a shared video resource, and when the identifier data has been linked to each of the corresponding participants, data may be displayed on the video display devices 24/24'/44 that identify each of the remote participants. As shown in the sample user interface 106, each of the three communication endpoints 12, 14, and 16 are detailed with visual representations of each of the participants. Furthermore, a text or symbol indicator 64 is provided for each participant to include the data corresponding to the participants, such as their name, title, organization, etc. Additionally, providing shading or some other visual indicator on the video display can provide an indication for the person who is speaking. In the example, the conference participant named Sue is speaking, and therefore is represented with a shaded presentation. Furthermore, a transcription indicator 66 may be provided for a transcription of a speaker's voice. In accordance with embodiments of the invention, it is therefore also contemplated that transcription applications may be incorporated within the computing devices that enable voice to text transcriptions to be generated. The transcription text can be displayed on the user interface in the form of a moving "ticker" of text as the participant speaks. It is also contemplated that the size of the transcription indicator can be set to provide a desired number of lines of text, as well as the size of the text so that the transcription can be most easily read.

It should be understood that the user interface 106 can be provided as a separate or independent screen display, or may be provided as a screen display incorporated in the actual video displayed of the conference participants. For example, the user interface 106 could be shown on second screen displays located at each of the communication endpoints, and the video images of the remote conference participants would appear in the normal manner on the respective video displays 24/24'/44. Alternatively, the user interface 106 could be incorporated in the video displays 24/24'/44 as a separate video image placed in a corner of the displays, similar to "box within a box" displays used to display different television channels on a single screen display. Additionally, it is contemplated that the data for each participant could be displayed directly below or adjacent the position of each participant as they are viewed on the video displays, thus, a composite image would be produced with video images of participants interspersed with selected data corresponding to the participants.

Figure 4:
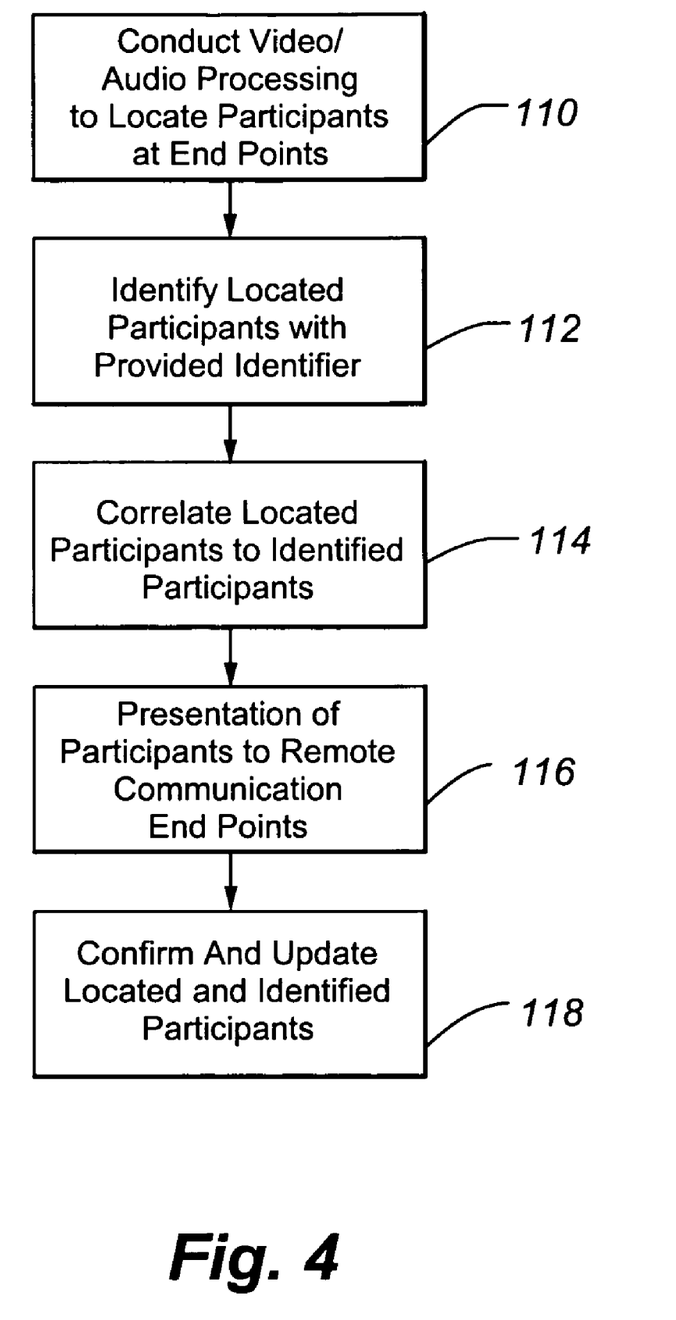
FIG. 4 is a simplified flow chart illustrating operation of the system and method of the present invention.

FIG. 4 is a simplified flow diagram illustrating the method of the present invention. Beginning with block 110, each of the respective video cameras at the communication end points take video images of the participants present to locate each of the participants at each endpoint. Alternatively or in addition to taking the video images, sound recordings can be made at each communication endpoint to record the voices of each participant at the locations in which the participants are to be found during the conference. The designated video/audio processing takes place to thereby separate and locate the various participants at each endpoint.

Next, as shown at block 112, participants at each endpoint are identified by evaluating the tags provided prior to the conference. For RFID tags, they are interrogated by the respective RFID transponders. As explained above, each of the participants carry an RFID transponder, and the signals produced by the transponders are then matched to existing data in the respective computing devices, or a central server servicing each of the communication endpoints. For bar code tags or other visual tags, video images are taken to capture acceptable images that are then matched to the existing data in the computing devices or central server.

As shown at block 114, the next step in the method is to correlate or match the located participant data to the identified participants, that is, the processed video/audio data indicating where and how many individuals are located at each communication endpoint (the located participant data) is matched to the data retrieved from the identifiers used (the identified participants). This step may be achieved by the integration application 102, or a combination of the integration application 102 with the video application 98 and the identifier application 100. Thus at this step, each transponder carried by a participant is matched with the appropriate located participant, and once the match has been made, the user interface 106 may be generated.

At block 116, the presentation of the participants to the communication endpoints can take place to include display of the user interface 106, either simultaneous with the video images of the participants, or at some time thereafter. As mentioned above, the user interface 106 can be produced in various forms to include a separate user interface, or an interface that is incorporated in the video images of the participants.

As shown at block 118, as the conference progresses, there may be a need to confirm and update located and identified participants. An appropriate algorithm may be developed for recommencing steps 110, 112, 114 and 116 so that the first located and identified participants are confirmed and updated as necessary. For example, if a participant leaves the field of view of the video camera, but may still be in range of the RFID interrogation field, then the user interface display could be annotated to show the continued presence of the participant, despite absence of the participant in the video images. If a participant leaves the conference altogether, that particular participant would be shown as being dropped from the conference by another indicator on the user interface such as a text message stating that participant was no longer present. As any new participants may arrive to the conference, assuming they also have an assigned RFID transponder, then those new participants may also be added to the user interface indicating the presence of that new participant.

There are a number of advantages to the method and system of the present invention. Since determining the locations of participants may be achieved by use of a simplified video processing technique that designates only location data as opposed to both location and identity data, video processing is made simpler and more cost effective. Bar code and RFID technology are well known in many industries, and integration of those technologies in the present invention can be achieved without changing fundamental bar code or RFID operating principles. The recent development of directional RFID readers allows discrimination between participants at a shared video resource, even if the participants are located within constrained spaces. The identifier data can be matched with the processed video/audio data to create a user interface that identifies all participants. A cyclical or repetitive video/audio processing technique coupled with repetitive interrogation or analysis of the tags allows the system to track participants as they may arrive or leave the conference. Other applications may supplement the basic tracking of individual participants, such as enhanced user interfaces denoting which participant is speaking, as well as incorporation of transcription applications for display of transcribed text.

The foregoing discussion of the invention has been presented for purposes of illustration and description. Further, the description is not intended to limit the invention to the form disclosed herein. Consequently, variations and modifications commensurate with the above teachings, within the skill and knowledge of the relevant art are within the scope of the present invention. The embodiments described herein are further intended to explain the best mode presently known of practicing the invention and to enable others skilled in the art to utilize the invention and such or other embodiments and other various modifications required by their particular application or use of the invention. Thus, it is intended that the independent claims be construed to include the alternative embodiments to the extent permitted by the prior art.

What is claimed is:

1. A method of identifying individual participants using a shared video resource during a videoconference, said method comprising:
    providing each participant with an RFID identifier;
    interrogating the RFID identifiers by an RFID Reader;
    taking at least one video image of the participants;
    conducting a video signal imaging processing technique to create a video sample providing location information for each participant, the location information indicating a location of a participant within a field of view of a camera at an associated endpoint; and
matching each RFID identifier with the corresponding participants located by said processing technique thereby providing identification of the participants.

2. A method, as claimed in claim 1, wherein:
    said video signal imaging processing technique comprises applying filters to said video images to produce filtered images and applying algorithms to the filtered images to generate positional data reflective of the locations of the participants.

3. A method, as claimed in claim 1, further comprising taking an audio recording of the participants' voices and conducting an auditory signal processing technique, wherein:
    said auditory signal processing technique comprises providing multiple microphones for obtaining voice signals from speaking participants and applying triangulation and auditory discrimination to said voice signals to generate positional data reflective of the locations of the speaking participants.

4. A method, as claimed in claim 1, further including:
identifying a participant speaking during said videoconference by a display provided on a user interface.

5. A method, as claimed in claim 1, further including:
    providing a display on a user interface of data corresponding to each participant.

6. A method, as claimed in claim 5, wherein:
    said data comprises at least one of a name, title, and organization of the participant.

7. A method, as claimed in claim 1, further including:
    providing a transcription of a participant speaking, said transcription appearing on a user interface display.

8. A method, as claimed in claim 1, further including:
    repeating said interrogating, taking, conducting, and matching steps to provide a continuous tracking of identification of the participants at the shared video resource.

9. A method, as claimed in claim 1, wherein:
    said RFID reader is a movable, directional RFID reader.

10. A method, as claimed in claim 5, wherein:
    said user interface comprises a screen display on a video monitor.

11. A method, as claimed in claim 10, wherein:
    said screen display is incorporated with video images of said participants taken during the conference and viewed on said video monitor.

12. A method of identifying individual participants using a shared video resource during a videoconference, said method comprising:
    assigning an RFID identifier to each participant, each said RFID identifier containing information pertaining to the assigned participant;
    providing RFID data records in a database corresponding to said information of said RFID identifiers;
    interrogating the RFID identifiers by an RFID reader and matching said information with said RFID data records;
    taking at least one video image of the participants;
    conducting a video signal imaging processing technique to create a video sample providing location information for each participant at their respective endpoint;
    matching said RFID data records with the corresponding participants located by said processing technique thereby providing identification of the participants; and
    repeating said interrogating, taking, conducting, and matching steps to provide a continuous tracking of identification of the participants at the shared video resource.

13. A method, as claimed in claim 12, wherein:
    said video signal imaging processing technique comprises applying filters to said video images to produce filtered images and applying algorithms to the filtered images to generate positional data reflective of the locations of the participants.

14. A method, as claimed in claim 12, further comprising taking an audio recording of the participants' voices and conducting an auditory signal processing technique, wherein:
    said auditory signal processing technique comprises providing multiple microphones for obtaining voice signals from speaking participants and applying triangulation and auditory discrimination to said voice signals to generate positional data reflective of the locations of the speaking participants.

15. A method, as claimed in claim 12, further including:
    identifying a participant speaking during said videoconference by a display provided on a user interface.

16. A method, as claimed in claim 12, further including:
    providing a display on a user interface of data corresponding to each participant.

17. A method, as claimed in claim 12, wherein:
    said data records comprise at least one of a name, title, and organization of the participant.

18. A method, as claimed in claim 12, further including:
    providing a transcription of a participant speaking, said transcription appearing on a user interface display.

19. A method, as claimed in claim 12, wherein:
    said RFID reader is a movable, directional RFID reader.

20. A method, as claimed in claim 12, wherein:
    said user interface comprises a screen display on a video monitor.

21. A method, as claimed in claim 12, wherein:
said screen display is incorporated with video images of said participants taken during the conference and viewed on said video monitor.

22. A video conferencing system enabling videoconferencing to take place between two remote communication endpoints comprising:
a camera for taking video images of participants in a videoconference at a first communication endpoint;
a data processor located at the first endpoint;
an RFID identifier associated with participants of the videoconference located at the first endpoint, each said RFID identifier including data that identifies the corresponding participant at the first endpoint;
a directional RFID reader located at the first endpoint for interrogating each RFID identifier used in the videoconference at the first endpoint;
a software application running on said processor, said software application manipulating said video images and said data obtained from said RFID reader, wherein video imaging processing of said video images provides location information of the participants at the first endpoint, and said software application further including means for matching the data from each RFID identifier with the corresponding locations of the participants determined from said video imaging processing; and
a user interface for viewing the video images of participants in the videoconference located at a second different communication endpoint, the user interface including data associated with the identified participants at the second endpoint.

23. A system, as claimed in claim 22, wherein:
said video imaging processing includes a video signal imaging processing technique comprising applying filters to said video images to produce filtered images and applying algorithms to the filtered images to generate position data reflective of the locations of the participants at the first endpoint.

24. A system, as claimed in claim 22, further including:
an auditory signal processing technique to supplement determination of the locations of the participants at the first endpoint, said auditory signal processing technique comprising a plurality of microphones incorporated at the first endpoint for obtaining audio data from voices of speaking participants, and means incorporated in said software application for processing said audio data to determine locations of said participants at the first endpoint.

25. A video conferencing system comprising:
a video camera for taking video images of participants in a videoconference;
a computing device;
an RFID transponder assigned to each participant of the videoconference, each said RFID transponder including data that identifies the corresponding participant;
an RFID reader for interrogating each RFID transponder used in the videoconference;
an application running on said computing device, said application manipulating said video images and said data obtained from said RFID transponders, wherein video imaging processing of said video images provides location information of the participants at their respective endpoint, and said application further provides means for matching the data obtained from the RFID transponders with the corresponding locations of the participants; and a user interface for viewing the data associated with the identified participants.

26. A system, as claimed in claim 25, wherein:
said video imaging processing includes a video signal image processing technique comprising applying filters to said video images to produce filtered images and applying algorithms to the filtered images to generate positional data reflective of the locations of the participants.

27. A system, as claimed in claim 25, further including:
an auditory signal processing technique to supplement determination of the locations of participants, said auditory signal processing technique comprising a plurality of microphones incorporating at the video conference for obtaining audio data from voices of speaking participants, and means incorporated in said application for processing said audio data to determine locations of said participants.

28. A system, as claimed in claim 25, wherein:
said user interface comprises a visual display including at least one of a name, title, and organization of the participants.

29. A system, as claimed in claim 25, wherein:
said user interface comprises a visual indicator of a participant speaking.

30. A system, as claimed in claim 25, wherein:
said user interface comprises a text transcription of a speaking participant, said text transcription being placed adjacent a visual representation of the speaking participant.

31. A method of identifying individual participants using a shared video resource during a videoconference, said method comprising:
providing at least one participant with an RFID identifier;
interrogating the RFID identifier by an RFID reader;
taking video images of at least the participant with the RFID identifier;
determining a location of the at least one participant by at least one of a video signal imaging processing technique and an auditory signal processing technique; and
matching the RFID identifier with the located at least one participant thereby providing identification of the at least one participant to other remote participants of the videoconference.

32. A method of identifying individual participants using a shared video resource during a videoconference, said method comprising:
assigning an RFID identifier to at least one participant, said RFID identifier containing information pertaining to the at least one participant;
providing an RFID data record in a database corresponding to said information of said RFID identifier;
interrogating the RFID identifier by an RFID reader and matching said information with said RFID data record;
taking a video image of at least the at least one participant;
determining a location of the at least one participant by a video signal imaging processing technique;
matching said RFID data record with the located at least one participant; and
repeating said interrogating, taking, determining, and matching steps to provide a continuous tracking of identification of the at least one participant at the shared video resource.

33. A video conferencing system comprising:
a camera for taking video images of participants in a videoconference;
a data processor;
an RFID identifier associated with at least one participant of the videoconference, said RFID identifier including data that identifies the at least one participant;
an RFID reader for interrogating the RFID identifier used in the videoconference;
a software application running on said processor, said software application manipulating said video images and said data obtained from said RFID reader, wherein video imaging processing of said video images determines a location of the at least one participant, and said software application further including means for matching the data from the RFID identifier with the location of the at least one participant; and
a user interface for viewing the video images of the participants in the videoconference and the data associated with the identified at least one participant.

34. A method of identifying individual participants using a shared video resource during a videoconference, said method comprising:
providing at least one participant with an identifier, said identifier comprising at least one of a visual tag, a bar code tag, and an RFID tag;
analyzing the identifier to determine data corresponding to the identifier;
taking video images of at least the participant with the identifier;
determining a location of the at least one participant by at least one of a video signal imaging processing technique and an auditory signal processing technique; and
matching the identifier data with the located at least one participant thereby providing identification of the at least one participant to other remote participants of the videoconference.

35. A method of identifying individual participants using a shared video resource during a videoconference, said method comprising:
assigning an identifier to at least one participant, said identifier containing information pertaining to the at least one participant;
providing an identifier data record in a database corresponding to said information of said identifier;
analyzing the identifier and matching said information with said identifier data record;
taking a video image of at least the at least one participant;
determining a location of the at least one participant by a video signal imaging processing technique;
matching said identifier data record with the located at least one participant; and
repeating said analyzing, taking, determining, and matching steps to provide a continuous tracking of identification of the at least one participant at the shared video resource.

36. A video conferencing system comprising:
a camera for taking video images of participants in a videoconference;
a data processor;
an identifier associated with at least one participant of the videoconference, said identifier including data that identifies the at least one participant;
means for analyzing the identifier, said means for analyzing including at least one of the camera, a bar code reading device, and an RFID reader;
a software application running on said processor, said software application manipulating said video images and said data obtained from said means for analyzing, wherein video imaging processing of said video images determines a location of the at least one participant, and said software application further including means for matching the data from the identifier with the location of the at least one participant; and
a user interface for viewing the video images of the participants in the videoconference and the data associated with the identified at least one participant.

* * * * *